(12) United States Patent
Lisuwandi et al.

(10) Patent No.: US 9,041,254 B2
(45) Date of Patent: May 26, 2015

(54) PRIMARY UNIT CONTROL OF RESONANT INDUCTIVE POWER TRANSFER SYSTEM FOR OPTIMUM EFFICIENCY

(75) Inventors: Eko Tan Lisuwandi, Andover, MA (US); Thilani Imanthika Dissanayake Bogoda, North Chelmsford, MA (US)

(73) Assignee: Linear Technology Corporation, Milpitas, CA (US)

( * ) Notice: Subject to any disclaimer, the term of this patent is extended or adjusted under 35 U.S.C. 154(b) by 734 days.

(21) Appl. No.: 13/325,959

(22) Filed: Dec. 14, 2011

(65) Prior Publication Data
US 2013/0154373 A1 Jun. 20, 2013

(51) Int. Cl.
*H01F 27/42* (2006.01)
*H02J 5/00* (2006.01)

(52) U.S. Cl.
CPC ...................................... *H02J 5/005* (2013.01)

(58) Field of Classification Search
USPC ......................................................... 307/104
See application file for complete search history.

(56) References Cited

U.S. PATENT DOCUMENTS

| | | | |
|---|---|---|---|
| 4,163,933 A * | 8/1979 | Foster ........................... | 320/158 |
| 7,605,496 B2 * | 10/2009 | Stevens et al. .................. | 307/17 |
| 2010/0133917 A1 * | 6/2010 | Sekino et al. ................. | 307/104 |
| 2011/0291491 A1 * | 12/2011 | Lemmens et al. ............ | 307/104 |

* cited by examiner

*Primary Examiner* — Jared Fureman
*Assistant Examiner* — Duc M Pham
(74) *Attorney, Agent, or Firm* — Cozen O'Connor

(57) ABSTRACT

A circuit and method for wirelessly coupling an electrical energy between an electrical energy source and at least one load is provided. The circuit comprises a primary unit and at least one secondary unit. The primary unit includes an input node for receiving an input voltage produced by the energy source; a transmitter circuit including a transmitter coil configured to generate an electromagnetic field; and a regulator. The regulator is configured to sense a current consumption of the primary unit, determine a gradient of the current consumption with respect to different input voltages, and determine an optimal input voltage based on the gradient. The at least one secondary unit comprises a receiver circuit and a load. The receiver unit includes a coil that wirelessly and inductively couples with the electromagnetic field of the primary unit to receive power therefrom. The receiver unit further includes a regulator circuit configured to provide a constant power to an output node.

23 Claims, 10 Drawing Sheets

PRIMARY UNIT CONTROL OF RESONANT INDUCTIVE POWER TRANSFER SYSTEM FOR OPTIMUM EFFICIENCY

BACKGROUND

1. Technical Field

This disclosure relates to wireless energy transfer and control thereof.

2. Description of Related Art

There is growing interest to transfer power wirelessly in order to charge or power various consumer electronic devices ranging from cell phones to heavy duty industrial equipment such as crane motors. In this regard, inductive charging uses an electromagnetic field to transfer energy between two objects. Energy is sent through inductive coupling to an electrical device used to either power or charge the device. The removal of a direct (i.e., wired) electrical contact between a transmitter and receiver circuit provides many advantages.

For example, inductive charging may lower the risk of electrical shock, when compared with conductive charging, because there are no exposed conductors. Further, it provides the ability to hermetically seal the power transmitter circuit and the receiver circuit. Such encapsulation of circuitry offers uses where water impermeability is desired, such as charging implanted medical devices or charging personal hygiene devices such as toothbrushes and shavers, which may come into contact with water.

Even in applications where electrical shock or hygiene may not be of paramount concern, inductive power transfer is often desirable. For example, the connection between a device to be powered and its power source may become frail over time. Further, establishing physical contact between a charger and the device are relatively time consuming.

Accordingly, wireless power transfer increases safety, reliability, and time efficiency, while decreasing maintenance cost.

FIG. 1 illustrates a typical wireless power transfer system 100 which includes a transmitter circuit 104 (i.e., primary unit) and a receiver circuit 110 (i.e., secondary unit). A transmit coil ($T_X$) 106 is energized to transmit a time varying magnetic field. The magnetic field generated by the transmit coil 106 induces current to flow in a receive ($R_X$) coil 108 in the vicinity of the generated magnetic field. In a resonant system 100, this ac current flows back and forth between the receive coil 110 and a tank capacitor (not shown) in the receiver circuit generating an output voltage. This ac voltage can then be rectified to produce a dc voltage at the output across a load $R_L$ 112. This regulated output voltage at the output of the receiver circuit 110 is capable of delivering dc current to power the load $R_L$ 112 on the receiver side.

The secondary unit 110 may use regulation to control the amount of power delivered to the load 112. In one example, this regulator can be a DC/DC converter that regulates its output voltage. For a fixed resistive load, the regulated output voltage controls the amount of current in the load 112 and hence the total amount of power delivered to the resistor 112.

Notably, there is no direct feedback from the receiver circuit 110 to the transmitter circuit. Without such feedback, the transmit circuit on the primary unit 104 may energize the transmit coil at a maximum level to accommodate a worst case operating condition on the secondary unit 110. For example, the worst case operating condition may involve maximum load current and lowest coupling between the two coils (i.e., coils 106 and 108). Energizing the transmit coil 106 at the maximum level may cause large power dissipation in the transmitter circuit 104 as well as the transmit coil 106 due to non idealities that exist in a real transmitter circuit 104 and a real transmit coil 106.

In this regard, the transmitter circuit 104 and the transmit coil 106 dissipate power even when there is no receiver circuit 110 or an $R_L$ 112 present. The non idealities (e.g., dissipative elements in the transmitter circuit 104) include switching losses. Further, the losses in the transmit coil 106 include $I^2R$ losses. One significant non ideality may be the parasitic series resistance of the transmit coil 106 itself. Such non-idealities are energy inefficient.

Accordingly, energizing the transmit coil 106 at a maximum level is not desirable if the receiver circuit 110 does not spend a substantial part of its operation delivering maximum power to the load $R_L$ 112. For example if the load 112 is the battery of a cell phone, the battery only needs to be charged at maximum current during a short period at the beginning of each charge cycle. Continuing to energize the transmit coil 106 at maximum level after this short period is energy inefficient.

In one approach to optimizing the overall efficiency of power transmission from the primary 106 to the secondary 110 side, physical feedback from the receiver circuit 110 to the transmitter circuit 106 is used. In this regard, there are many methods to provide such feedback.

For example, there may be an opto-coupler to provide direct feedback information from the receiver circuit 110 to the transmitter circuit 104. In another example there may be a dedicated radio link with a wireless communication protocol to provide this feedback information. Still other methods may employ indirect observation of primary unit ac waveforms by slight modulation of the secondary resonance capacitor. This modulation can then be used as a low bandwidth radio link to send the feedback information from the receiver circuit 110 to the transmitter circuit 104.

However, the prior art essentially relies on direct feedback information from the receiver circuit 110 to the transmitter circuit 104 in order to regulate the power transfer from the transmitter circuit 104 to the receiver circuit 110.

Accordingly, it would be desirable to provide active control of the power transfer from the transmitter circuit to the receiver circuit and the load by indirectly determining the conditions of the receiver circuit and the load.

SUMMARY

A circuit and method for wirelessly coupling an electrical energy between an electrical energy source and at least one load is provided. The circuit comprises a primary unit and at least one secondary unit. The primary unit includes an input node for receiving an input voltage produced by the energy source; a transmitter circuit including a transmitter coil configured to generate an electromagnetic field; and a regulator. The regulator is configured to sense a current consumption of the primary unit, determine a gradient of the current consumption with respect to different input voltages, and determine an optimal input voltage based on the gradient. The at least one secondary unit comprises a receiver circuit and a load. The receiver unit includes a coil that wirelessly and inductively couples with the electromagnetic field of the primary unit to receive power therefrom. The receiver unit further includes a regulator circuit configured to provide a constant output current or voltage to an output node.

The circuit and method enable the active regulation of the power transfer from a transmitter circuit to a receiver circuit and its load by indirectly determining the power requirements of the receiver circuit and its load. This determination is indirect in that the power requirement is not directly provided by the receiver circuit; instead, it is determined by the transmitter circuit. In one embodiment, the input voltage in the primary unit is ramped in a first direction (e.g., positive). The current consumption is sensed and stored in a memory. For each voltage step the gradient of the current consumption with respect to the input voltage for each step is determined and recorded in the memory. The change in the gradient at certain voltage steps indicates the point where there is active regulation of a load on the secondary unit. For example, by comparing the gradient at each voltage step to a predetermined first threshold, the optimal input voltage can be determined. If the gradient is greater than the first threshold, then the ramp continues. If it is equal to or less than the first threshold, that means the optimal point has been reached.

In one embodiment, the input voltage is set at one step above the determined optimal input voltage. This is to assure that inherent variations in the system don't disturb the regulation of the load in the secondary unit. This input voltage may be kept fixed for a predetermined time. This predetermined delay period may be based on how fast the load of the at least one secondary unit changes and/or how fast the primary unit can react to the change in load of the secondary unit. Further, the predetermined delay may be based on a minimum acceptable speed at which the primary unit can react to the change in its supply voltage.

After this delay period, the voltage is ramped in a second direction (which is opposite to the first direction). In each voltage step, the current consumption in the primary unit is sensed. As in the first direction, the gradient of the current consumption with respect to the input voltage is determined for each voltage step. These values are stored in a memory. The gradient at each voltage step is calculated and compared to a predetermined second threshold value. In one embodiment, the second threshold is the same as the first threshold. Again, if the second threshold is exceeded, that indicates that the secondary unit has lost regulation of its load. Then the voltage ramp changes direction (to the first direction) and the cycle continues.

Accordingly, the optimal input voltage of the primary unit is maintained for efficient power transfer without direct feedback from the secondary unit.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

The various examples discussed below enable the active regulation of the power transfer from a transmitter circuit to a receiver circuit and its load, by indirectly determining the power requirements of the receiver circuit and its load. This determination is indirect in that the power requirement is not directly provided by the receiver circuit; instead, it is determined by the transmitter circuit through an analysis of the current consumption of the transmitter circuit.

Figure 1:
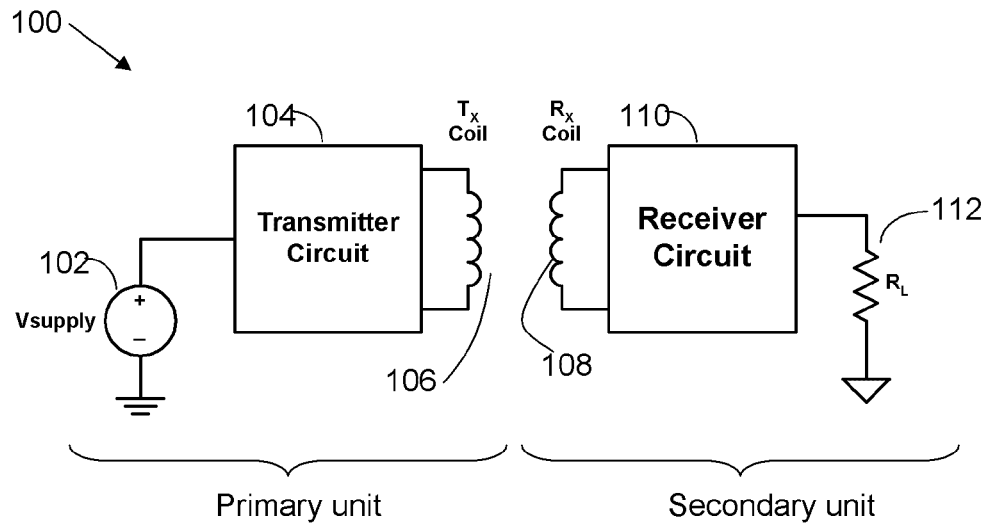
FIG. 1 illustrates an example of a typical wireless power transfer system.

Consider, for example, that in circuit 100 of FIG. 1, the system power is delivered wirelessly from the transmitter circuit 104 to the receiver circuit 110 (i.e., via the transmitter coil 106 coupling with the receiver coil 108), there is no power amplification in the overall system. Put differently, all incremental power consumed on the secondary unit is provided wirelessly by the primary unit. Consider further that the receiver circuit 110 of the secondary unit includes a regulator to regulate its output voltage across load $R_L$ 112. For each given load $R_L$ 112, there is an optimal total input power to the primary unit. Any additional power consumed by the primary unit beyond this optimal point is wasted. The primary unit can detect the point (i.e., input voltage) when it is transmitting enough power by monitoring the current consumption in the primary unit. For example, by modulating (e.g., increasing or decreasing) the supply voltage of the transmitter circuit 104 while monitoring the incremental change in current consumption, the optimal supply voltage of the transmitter circuit can be determined to provide the most efficient power transfer between the primary unit and the secondary unit. In one embodiment, the optimal point for most efficient power transfer is when the incremental change in current consumption begins to decrease.

In FIG. 1, in the transmit coil ($T_X$) 106, the magnetic field strength generated is directly proportional to the AC current flowing through the coil 106. This AC current is directly proportional to the AC voltage applied across this coil 106. The amplitude of this AC voltage may be modulated by controlling the output power of the primary unit power source 102.

In one example, the AC voltage across transmitter coil 106 is generated from a DC source. The DC source is converted to AC using a DC to AC converter (not shown). The AC voltage may be proportional to the DC or average voltage applied across the transmitter circuit 104. Thus, varying the DC voltage directly may vary the magnetic field strength of the transmitter coil 106, which in turn varies the amount of power available to the secondary unit.

The inductive power of the primary unit is coupled to the secondary unit. Put differently, the receiver coil 108 of the receiver circuit 110 is adapted to couple with the magnetic field of the transmitter coil 106 of the transmitter circuit 104 without direct electrical contact. Thus, power is transferred inductively from the primary unit to the secondary unit. Since the power provided to the secondary unit originates from the primary unit, by monitoring the power consumption of the primary unit, an indirect insight of the conditions of the secondary unit can be obtained.

Figure 2:
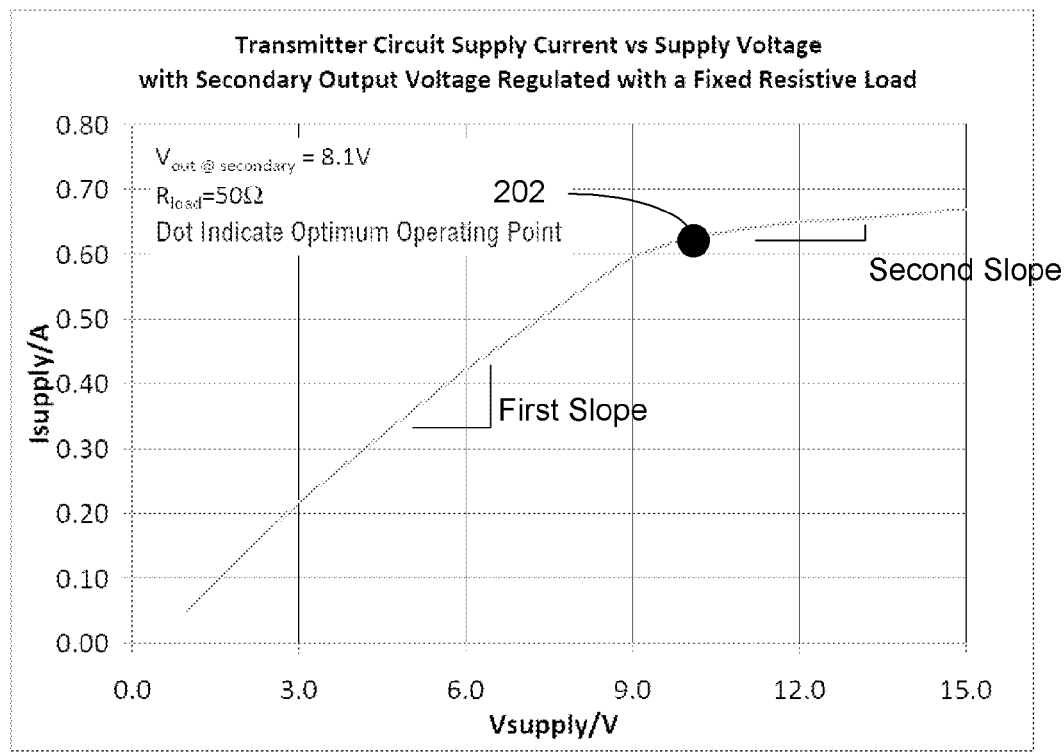
FIG. 2 illustrates an example of power consumption of a primary unit with a fixed load on a secondary unit with a regulated output voltage.

By way of example, reference now is made to FIG. 2 which illustrates the power consumption of a typical primary unit with a fixed load $R_L$ 112 on the secondary unit, where the voltage across $R_L$ 112 is regulated. It is a graph of the transmitter circuit 104 supply current ($I_{supply}$) versus the supply voltage ($V_{supply}$) 102 where the secondary output voltage across the load $R_L$ 112 is regulated and the load $R_L$ 112 is fixed. For example, the $V_{supply}$ 102 may be varied from a low voltage (e.g. 0V) to a high voltage (e.g. 15V). As the power (i.e., $I_{supply} \times V_{supply}$) is increased, the secondary incremental power consumption decreases when regulation of the output voltage across the load $R_L$ 112 is achieved. The dot 202 in FIG. 2 represents an optimum operating point. The concept of an optimal operating point for a regulated output voltage may be better understood with the following examples.

Figure 3:
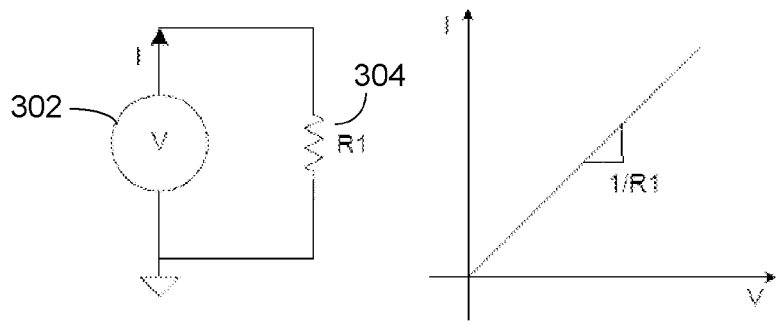
FIG. 3 illustrates a voltage source providing voltage across a fixed load.
Figure 4:
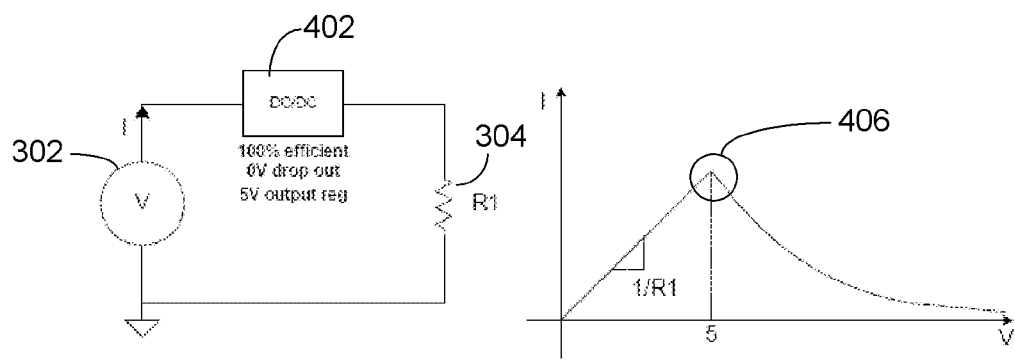
FIG. 4 illustrates a system having a regulator 402 with 100% efficiency and 0V drop out.

By way of example, FIG. 3 illustrates a voltage source 302 providing voltage across a fixed load 304. As the voltage 302 across the load 304 increases, the current increases linearly. Thus, as the voltage provided to the load 304 increases, the power consumption increases. In contrast, FIG. 4 illustrates a system with a regulator 402 (e.g. DC/DC) with 100% efficiency and 0V drop out. It regulates the voltage across the load 304 to a predetermined level (e.g. 5V). Until the predetermined level is reached, the current consumption increases linearly with the voltage applied (as in FIG. 3). However, current consumption drops as soon as the input voltage 302 reaches the predetermined level (e.g., 5V in this example). That is because the regulator 402 provides a constant power load (i.e., $P=V*I=5^2/R=25/R$). The regulator is able to achieve regulation as soon as the input reaches the predetermined voltage level, making any additional voltage provided by the source 302 superfluous.

Figure 5:
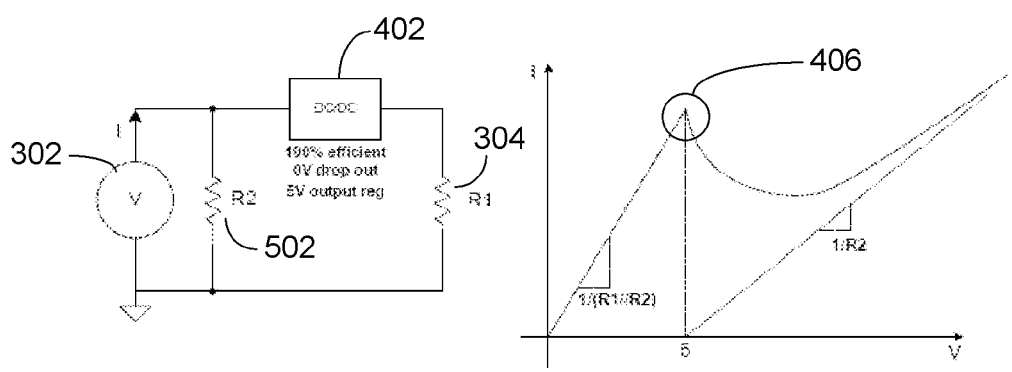
FIG. 5 illustrates a system with a dissipative element and load.

By way of example, FIG. 5 illustrates a system with a dissipative element R2 (502) and load R1 (304). As the input voltage 302 increases up to a predetermined level (e.g. 5V) the current increases linearly with a gradient of 1/(R1∥R2)= (R1+R2)/R1R2. Once the desired voltage across the load 304 is reached by the regulator 402, the incremental power demand decreases. That is because power consumption across the load 304 is now fixed to 25/R and any incremental power consumption is now governed by the dissipative element R2 (502). Accordingly, as the voltage 302 increases, the current can be estimated by a new gradient of 1/R2 at higher voltages. Thus, by determining the point 406 where the gradient of the current with respect to the applied voltage changes, the optimal input voltage for the system can be established. For example, the optimal criteria may be the minimum power dissipation on R2 (502) while allowing the voltage on R1 to be regulated.

Figure 6:
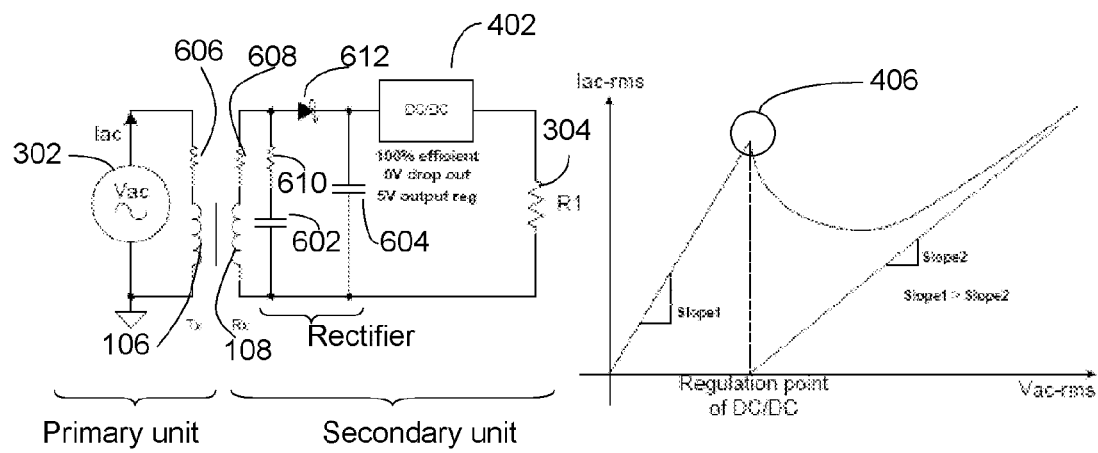
FIG. 6 illustrates a model of a wireless inductive power transfer system consistent with an embodiment of the present invention.

FIG. 6 illustrates a model of a wireless inductive power transfer system consistent with an embodiment of the present invention. An AC source 302 provides AC current to the transmitter coil 106 which is inductively coupled to receiver coil 108. Resistances 606 and 608 represent parasitic resistance of the transmitter 106 and receiver 108 coils respectively. For example, there may be a rectifier, comprising a diode 612, and capacitor 604, which convert the AC voltage from the resonant tank comprising capacitor 602 and receiver coil 108 to a DC signal. This DC signal is provided to a converter 402 (e.g., DC/DC) which provides a regulated output voltage to load 304. Since the transmitting coil 106 and the receiving coil 108 are generally dissipative due to parasitic resistances (i.e., 606 & 608 respectively), a similar graph as in FIG. 5 is obtained. As discussed in the context of FIG. 5, the gradient of the current with respect to the input voltage applied is different before reaching a regulation point and after reaching a regulation point (i.e., gradient before load regulation > gradient after load regulation).

As discussed before, the change in gradient in the graph of FIG. 6 indicates the fact when there is not sufficient power on the secondary unit to achieve regulation, the secondary unit tries to absorb as much power as possible from the primary unit to deliver to its load 304. As soon as enough power is available to achieve regulation, the secondary unit will reduce its incremental power demand. This is represented by the regulation point 406. Any incremental power consumption visible on the primary unit is due to parasitic inefficiency on both the primary and secondary units. The magnitude of the gradient (i.e. slope) changes can vary depending on the primary and secondary inherent efficiency. Notably, there is always a change in gradient once a secondary unit achieves regulation. This change in gradient can be used to determine the optimal power transfer from the primary unit to the secondary unit.

Figure 7:
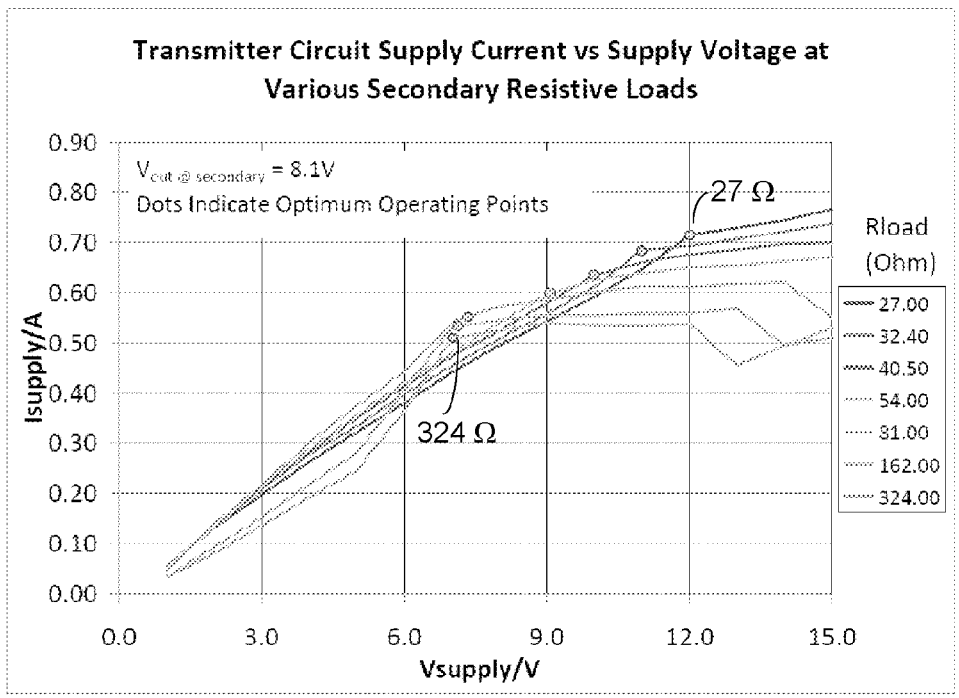
FIG. 7 illustrates curves of power consumption of a primary unit of an inductive power transfer system consistent with an embodiment of the present invention, for different loads on the secondary unit.

FIG. 7 illustrates curves of power consumption of an exemplary primary unit of an inductive power transfer system consistent with an embodiment of the present invention, for different loads on the secondary unit. This curve illustrates that as the resistance of the load increases, the optimal current supply (and voltage supply) is reduced. This is indicated by a change in gradient at different supply voltages for different loads. In one embodiment, the power provided by the primary unit to the secondary unit is actively adjusted as the load drifts higher or lower. For example, the resistance of the load may increase over time due to operating at a higher temperature. In this regard, the supply voltage and current provided to the secondary unit is actively reduced as the load increases. Similarly, if the resistance of the load becomes smaller, the supply voltage and current provided to the secondary unit is actively increased until the optimal point is reached, as indicated by a change in gradient.

In one embodiment, the primary unit voltage is periodically modulated to determine the voltage at which a change in gradient occurs. This may be a DC or AC voltage. In this regard, the voltage of the primary unit is regulated to maintain that voltage. The magnitude of the final gradient is based on a predetermined value, which may vary from one application to another based on the efficiency of the primary and secondary unit. This method enables direct sensing of secondary power consumption from the primary unit thereby allowing the primary unit to energize the coil of the secondary unit just enough to achieve the secondary unit regulation of the output voltage. This reduces any standing losses in the primary circuit, optimizing the overall system efficiency. These optimum operating points are indicated by the dot for each different load resistance in FIG. 7.

Figure 8:
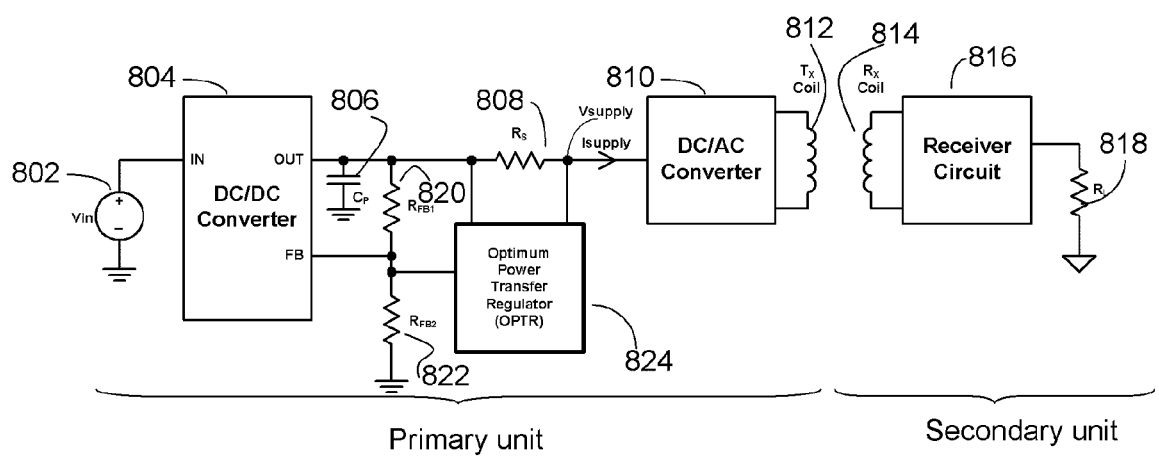
FIG. 8 illustrates a simplified block diagram of a wireless power transfer system with an Optimum Power Transfer Regulator (OPTR) block, consistent with an embodiment of the present invention.

FIG. 8 is a simplified block diagram of a wireless power transfer system with an Optimum Power Transfer Regulator (OPTR) block, consistent with an embodiment of the present invention. The wireless power transfer system of FIG. 8 includes a primary unit and a secondary unit. The primary unit includes a voltage source 802 (which may be a DC voltage source) coupled to a DC to DC converter 804. The converter 804 has an output capacitor 806 to condition the output signal. The primary unit further includes a resistive divider (i.e., $R_{FB1}$ and $R_{FB2}$) to provide feedback to the converter 804. The output of the converter 804 is provided to the OPTR 824 through a sense Resistor $R_S$ 808. The OPTR is discussed in more detail in a later section. The primary unit further includes a DC to AC converter 810 and a transmitter coil 812. As to the secondary unit, it includes a receiver coil 814, a receiver circuit 816, and a load $R_L$ 818.

The supply voltage to the DC to AC converter 810 is provided by the DC/DC converter 804. This DC/DC converter 804 output voltage is adjusted by the OPTR 824. The OPTR module performs the gradient detection and supply voltage modulation by sensing the current through the sense resistor $R_S$ 808. The OPTR 824 modulates a current injected to the DC/DC converter feedback resistor 822. These blocks will be described in more detail below.

Figure 9:
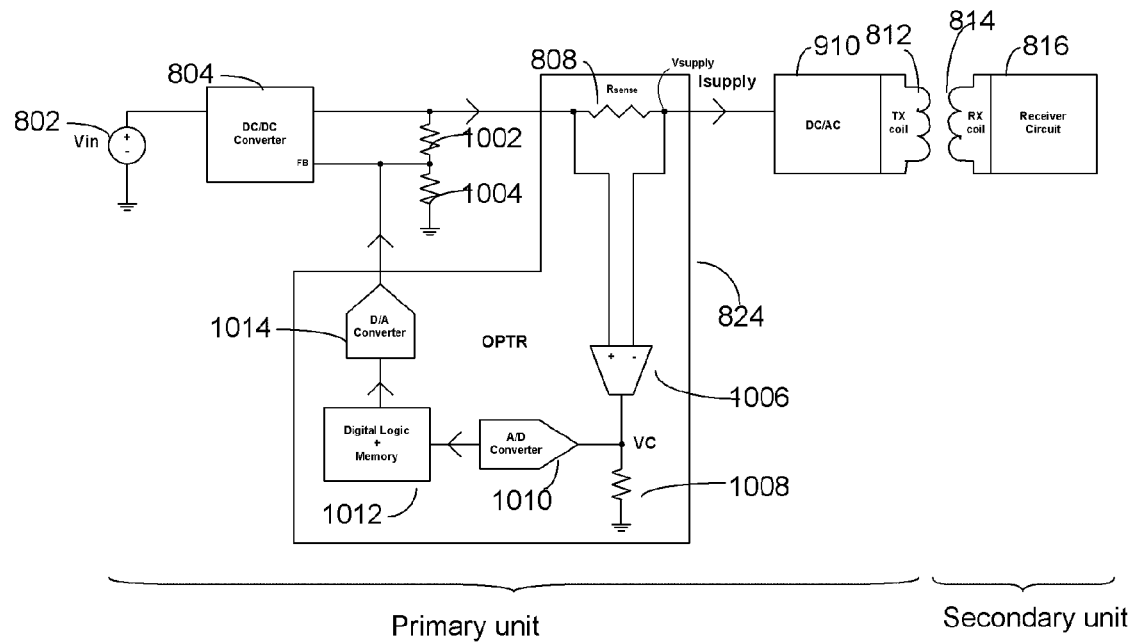
FIG. 9 illustrates a simplified block diagram of a wireless power transfer system with a simplified block diagram of the OPTR, consistent with an embodiment of the present invention.

FIG. 9 illustrates a simplified block diagram of a wireless power transfer system with a simplified block diagram of the OPTR block, consistent with an embodiment of the present invention. The transmitter circuit includes the following blocks: a DC/DC converter 804, a DC/AC converter 910, and an OPTR circuit block 824. As to the OPTR circuit block 824, it includes a current sensor 1006 and 1008 that senses the current going through sense resistor $R_{sense}$ 808 and a logic block 1012 that includes a memory element therein. The current flowing through the sense resistor 808 indicates the current consumption of the primary unit. The current sensor 1006 and 1008 stores the periodic current measurements in the memory of the logic block 1012.

In this example, the current sensor is a transconductance amplifier 1006 whose output is connected to a resistor 1008. Accordingly, the voltage generated at VC is proportional to the current flowing across the sense resistor 808. The voltage across the output resistor 1008 may be sampled by an A/D converter 1010 to generate a digital representation of the voltage across the output resistor 1008.

The digital logic and memory block 1012 may be implemented using, for example, a complex programmable logic device (CPLD). In one embodiment, the CPLD implements algorithm steps, including storing and comparing the current (I) values determined by the current sense amplifier 1006 at each sample.

The OPTR circuit 824 of FIG. 9 may further include a D/A converter 1014 coupled to the output of the digital logic and memory block 1012. The D/A converter 1014 translates a digital value output of the CPLD of the digital logic 1012 into a current at the output of the D/A converter. This current is used to change the feedback (FB) voltage to the DC/DC converter 804.

Figure 10:
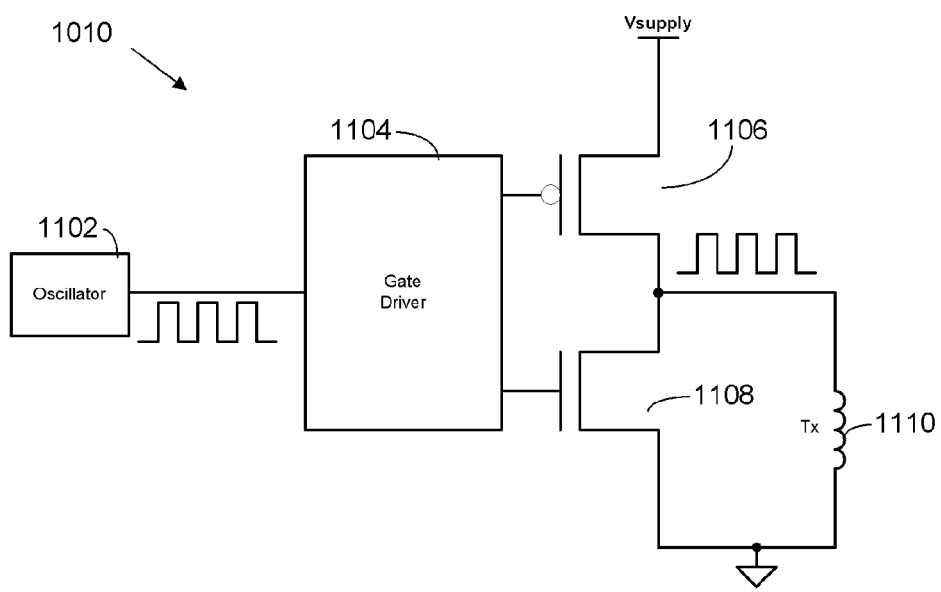
FIG. 10 shows an example of an DC/AC converter circuit, consistent with an embodiment of the present invention.

FIG. 10 shows an example of a DC to AC converter circuit, consistent with an embodiment of the present invention. An oscillator 1102 creates a square wave at a predetermined frequency. This square wave is provided to the input of a driver 1104. For example, the driver 1104 may be a half-bridge gate driver. The output of the driver 1104 is coupled to a transistor coupled to a high voltage (e.g., $V_{supply}$) and a transistor coupled to a low voltage (e.g. ground). In one embodiment, the transistor coupled to the high voltage is a PFET 1106 and the transistor coupled to the low voltage is an NFET 1108. The output of the DC/AC converter provides a low impedance square wave signal that can be fed onto the transmitting coil 1110. The amplitude of the square wave voltage on the coil 1110 is substantially equal to the high voltage (e.g. $V_{supply}$).

Figure 11:
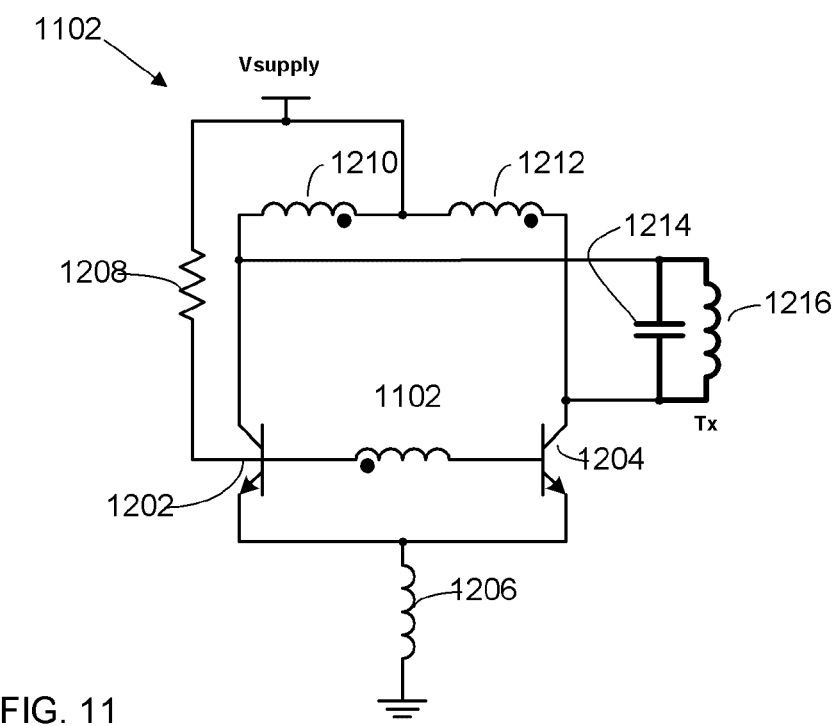
FIG. 11 shows another example of an DC/AC converter circuit, consistent with an embodiment of the present invention.

FIG. 11 shows another example of a DC to AC converter circuit, consistent with an embodiment of the present invention. This DC to AC converter can be a self oscillating structure (e.g., Royer oscillator) to create a sinusoidal voltage across the transmitting coil 1216. What contributes to the oscillation is the fact that a signal is driven to the bases of the NPN (i.e., 1202 and 1204 respectively) that is in opposite polarity to the signal of their respective collectors by using the tightly coupled inductors 1210, 1212 and 1102

Figure 12A:
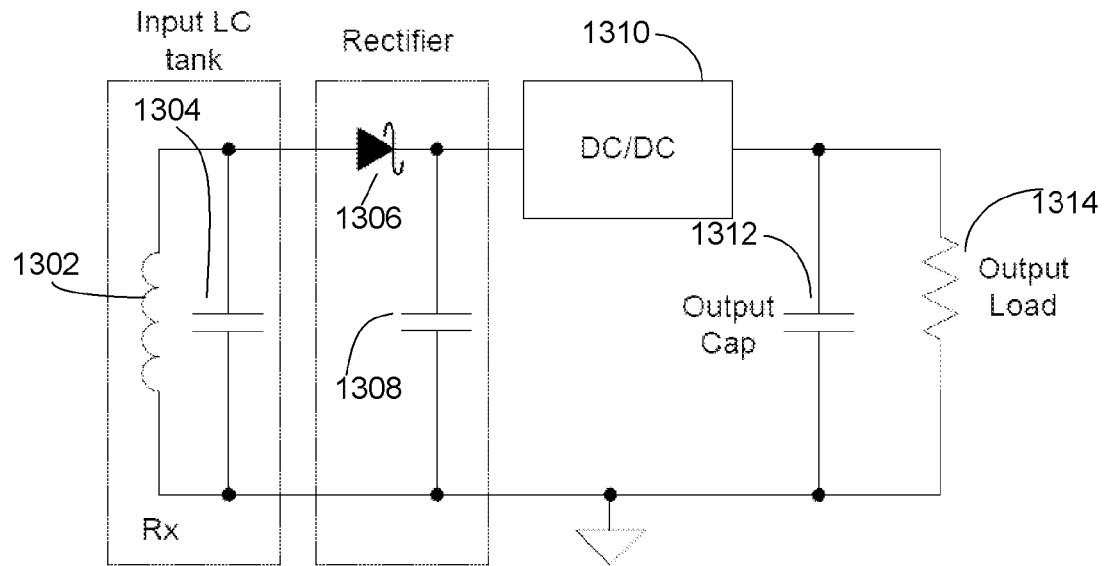
FIG. 12A illustrates an example of a receiver circuit that is consistent with an embodiment of the present invention.
Figure 12B:
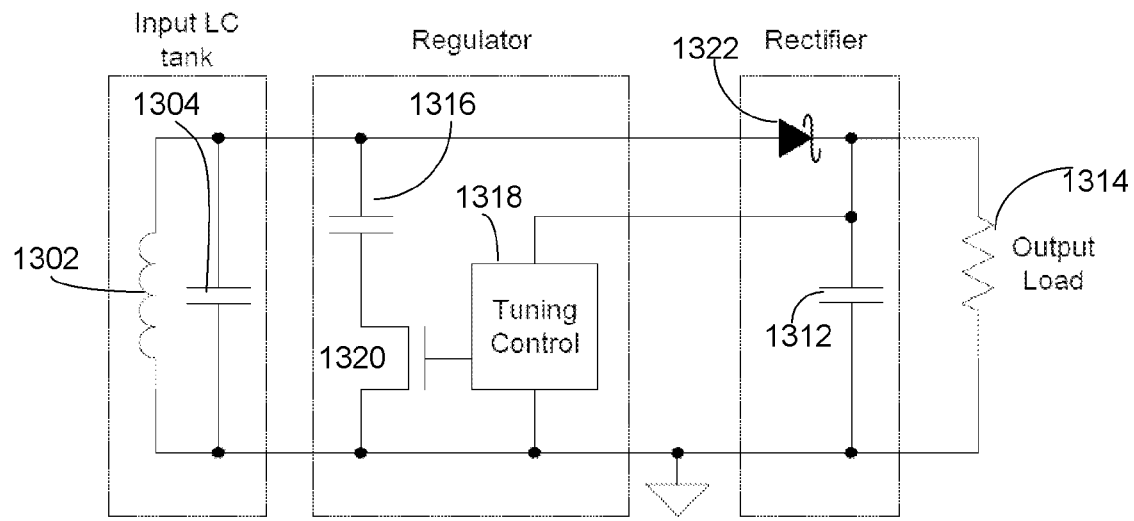
FIG. 12B illustrates an example of a receiver circuit that is consistent with another embodiment of the present invention.

FIGS. 12A and 12B illustrate examples of different receiver circuits that are consistent with different embodiments of the present invention. FIG. 12A includes a tuned LC tank circuit (i.e., 1302 and 1304 respectively). The output of the LC tank is coupled to a rectifier comprising a diode 1306 and a capacitor 1308. The output of the rectifier is coupled to a DC/DC converter 1310.

FIG. 12B includes a tuning control 1318 instead of a DC/DC converter of 1310 of FIG. 12A. In both instances, a regulated output is provided across an output load 1314.

The foregoing examples of the different building blocks of a wireless power transfer system are included in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings. One skilled in the art will realize other circuits could be used to implement the building blocks and that other configurations can be used based on the teachings herein. In each embodiment, the primary unit regulates the power transferred to the secondary to provide a regulated output voltage to a load by indirectly determining the power requirements of the secondary unit.

Figure 13:
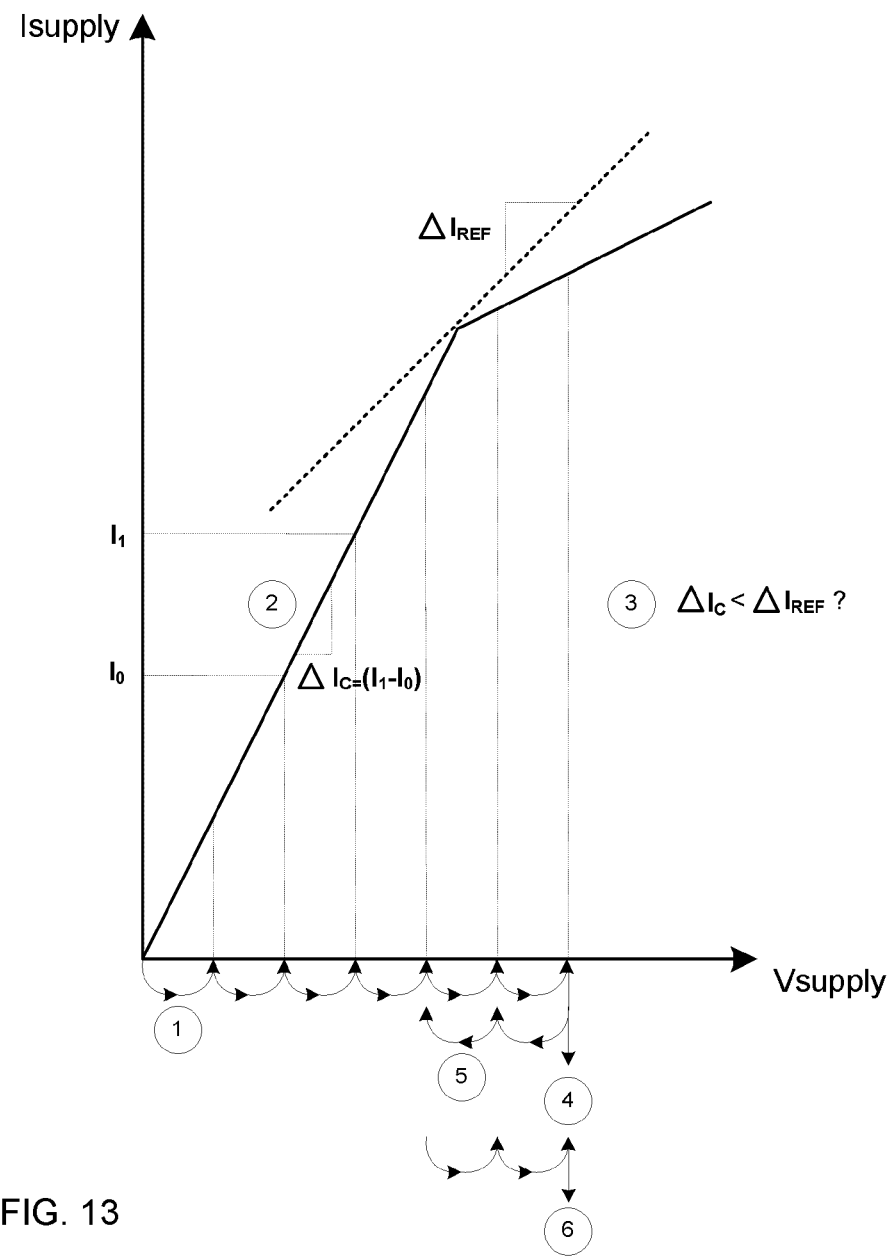
FIG. 13 shows a simplified graph of how the primary unit current (I) varies as the primary unit voltage (V) is increased in an inductive power transfer system with a regulated output secondary unit.

Reference now is made to FIG. 13 which illustrates how the optimal voltage point may be determined in one sample embodiment. It provides a simplified graph of how the current (I) varies as the voltage (V) is increased. The current and voltage values are in the primary stage of a wireless power transfer system.

For example, at startup (i.e. step 1), the input voltage is ramped up at a predetermined step size. In one embodiment, the voltage step size is uniform. The step size is set based on the application. For example, the smaller the step size, the more resolution is obtained, resulting in a more accurate point of operation (i.e. voltage setting at the primary unit). In another embodiment, a binary search can be used for the optimal point of operation. In each sample (i.e., voltage step), the current consumption of the primary stage is determined. This current value is recorded in a memory. For example, the current value can be stored in the digital logic and memory block 1012 of FIG. 9.

In step 2, the difference between a first current value ($I_1$) and the original current value ($I_0$) is determined. A gradient of the current versus voltage is determined for each voltage step and stored in the memory.

$$\Delta I_C = (I_1 - I_0) \quad \text{(Eq. 1)}$$

In one embodiment the calculations are performed after a predetermined voltage range is swept. In another embodiment, the calculations are performed at each voltage step.

In step 3, the calculated gradient (i.e., slope) of the current with respect to the input voltage for each step is compared to a predetermined threshold (i.e., $\Delta I_{REF}$).

$$\Delta I_C \leq \Delta I_{REF}? \quad \text{(Eq. 2)}$$

Again, the $\Delta I_{REF}$ value may be based on the requirements of the particular application. For example, the closer the $\Delta I_{REF}$ to the incremental current consumption of the primary unit when there is no load on the secondary ($\Delta I_{STDBY}$), the more accurate the point of operation. However, if $\Delta I_{REF}$ is too close in value to $\Delta I_{STDBY}$ (i.e., within the inaccuracies of the system) then an erroneous point of operation may be obtained. The $\Delta I_{REF}$ value can be set by initially calibrating the system and finding out the reliable and acceptable value for optimum efficiency. For example, the value may be set based on $\Delta I_{STDBY}$ with enough margin to account for a worst case inherent variation of the current in the primary unit with a secondary unit having no load. Put differently, the threshold is set to be larger than the inherent random offsets, repetitive dynamic variations and systematic inaccuracies in the primary unit and the at least one secondary unit.

For example, in order for random offsets and other systematic inaccuracies in the system to be a non consequential, the primary and the secondary inherent efficiencies are considered. This is to ensure that the change in gradient (i.e., slope) is significant enough for detection such that it is not part of the inherent inaccuracy of the system. In this regard, in a well designed system, at each optimum point most power is delivered to the load of the secondary unit instead of being dissipated by inefficiencies in the wireless power transfer system.

If $\Delta I_C > \Delta I_{REF}$, then the optimal supply voltage of the primary unit has not been reached. However, for a system with a single secondary unit, the first instance where $\Delta I_C \leq \Delta I_{REF}$, indicates that that the secondary unit has achieved regulation of its load and that an optimal supply voltage of the primary unit has been reached. Notably, this determination was made without any direct feedback from the secondary unit.

In one embodiment, even though the point where the gradient changes indicates the optimum operating condition, in a practical implementation, the supply voltage may be set just beyond this point. For example, it can be one voltage step above the point where the gradient changes or a fixed but programmable level above the point where the gradient changes. This is to ensure that any random offsets and slight variation in load currents do not cause the receiver circuit to immediately go out of regulation.

Step 4 is after the optimal supply voltage has been established. In one example, the voltage stepping is paused for a predetermined time ($T_d$). In one embodiment $T_d$ is set by finding the minimum frequency for a particular system that ensures that the system maintains regulation at the output of the secondary unit and maintains operation at the optimal power efficiency point the majority of the time. In other words $T_d$ is set by considering how fast the receiver load changes and what the acceptable delay for the primary unit is to react to a change in load. In this regard, the settling speed of both the transmitter and the receiver circuit may be considered.

In step 5, after $T_d$ expires, the supply voltage is continuously stepped down. In one example, the step down size is the same as the step up size. In another embodiment, the step down size is smaller than the step up size. While in yet another embodiment, the step size goes down every time the direction of the voltage stepping is altered.

After every step down, the current value is recorded in a memory. The difference between a new current value ($I_0$) and the prior current value ($I_1$) is determined. A gradient of the current versus voltage is determined for each voltage step and stored in the memory. This value is compared to a predetermined threshold value. In one embodiment, the predetermined threshold value is the same as the one used during the step up.

If $\Delta I_C \leq \Delta I_{REF}$, then the optimal supply voltage of the primary unit has not been reached and the stepping down of the voltage continues. However, the first instance where $\Delta I_C > \Delta I_{REF}$ is indicative that the optimal point is in the vicinity.

In step 6, the voltage is stepped up again and the cycle continues with step 1.

The foregoing exemplary method continually adjusts the optimum voltage value of the primary unit of a wireless power transfer system without direct feedback from the secondary unit. Accordingly, just enough power is delivered to the secondary unit to achieve proper regulation of the voltage across a load. Further, as the load varies, the system automatically adjusts to the proper voltage level for the primary unit to achieve efficient power transfer to the secondary unit.

The foregoing method generally discusses a single secondary unit for simplicity, the concepts herein can be extended to include multiple receiver coils (e.g., several secondary units that are powered by a single primary unit). For example, if each secondary unit regulates its output voltage (or current) to its respective load, a substantially similar method can be used on the primary unit to detect the point where all the receiver circuits are in regulation. Multiple gradient (i.e., slope) changes may be visible on the transmitter circuit supply current. Accordingly, the input voltage of the primary unit is regulated at the last point where the gradient changes (or this point plus one additional voltage step). The following discussion further clarifies this concept.

Figure 14:
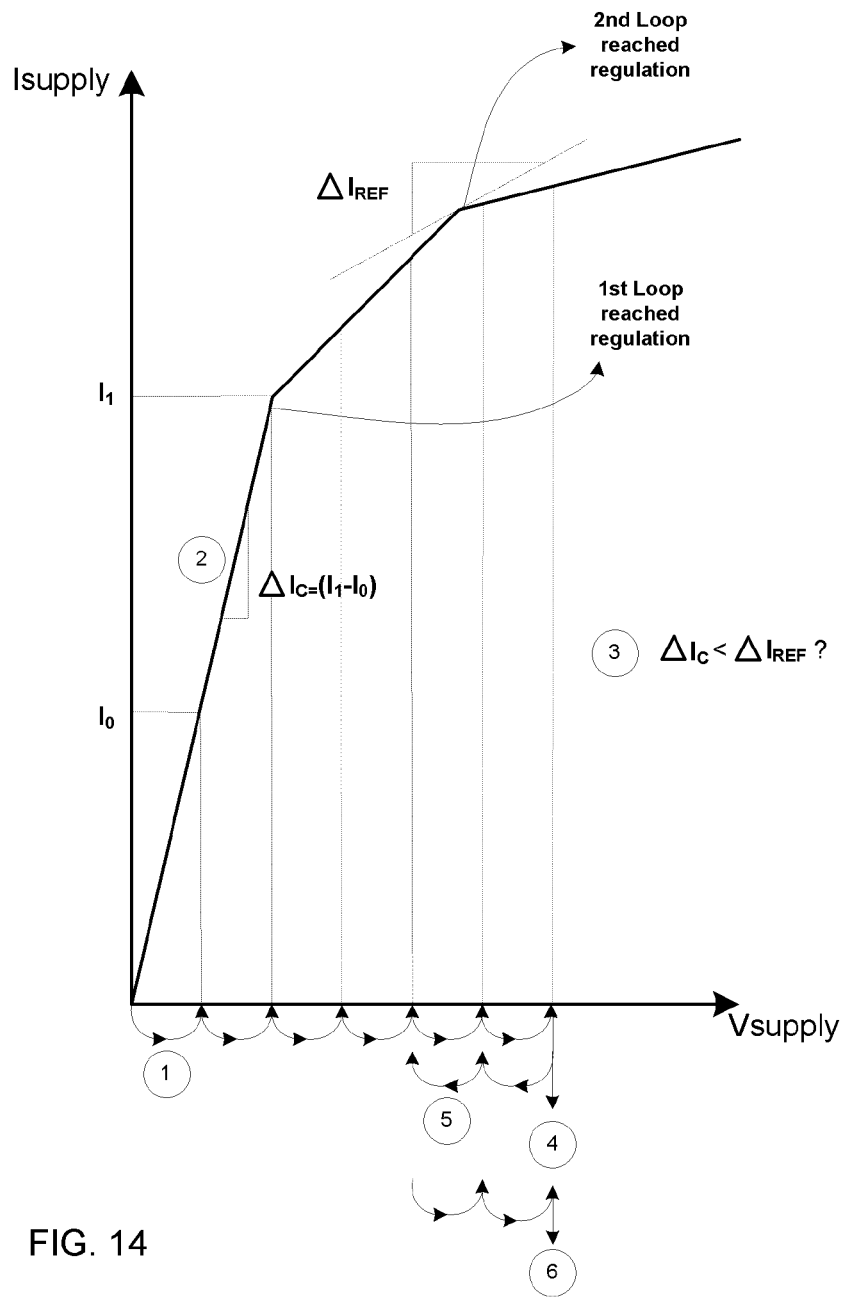
FIG. 14 shows a simplified graph of how the primary unit current (I) varies as the primary unit voltage (V) is increased in an inductive power transfer system with N (where N>1) secondary units are coupled to a single primary unit in a wireless power transfer system.

FIG. 14 illustrates an example of how the optimal voltage point may be determined when N (where N>1) secondary units are coupled to a single primary unit in a wireless power transfer system. It provides a simplified graph of how the current (I) varies as the voltage (V) is increased, wherein the current and voltage values are in the primary unit of a wireless power transfer system. The steps are similar to having a single secondary unit, except that the optimal point is determined at the last gradient change (i.e., 2 in this example). Notably, two or more of the N different receivers can achieve regulation at the same time. In this regard, fewer than N gradient changes may be observed.

For example, at startup (i.e. step 1), the input voltage is ramped up at a predetermined step size. In each sample (i.e., voltage step), the current consumption of the primary stage is determined. This current value is recorded in a memory.

In step 2, the difference between a first current value ($I_1$) and the original current value ($I_0$) is determined. A gradient of the current versus voltage is determined for each voltage step and stored in the memory.

$$\Delta I_C = (I_1 - I_0) \quad \text{(Eq. 3)}$$

This value is compared to a predetermined first threshold (i.e., $\Delta I_{REF}$).

$$\Delta I_C \leq \Delta I_{REF}? \quad \text{(Eq. 4)}$$

For example, if $\Delta I_C > \Delta I_{REF}$, then the optimal supply voltage of the plurality of secondary units has not been reached. The first instance where the gradient value changes but where the condition $\Delta I_C > \Delta I_{REF}$ still holds, is indicative that the optimum supply voltage of at least one of the secondary units has been reached. However, since there are additional secondary units, the voltage of the primary unit continues to ramp.

In step 3, when eventually the condition $\Delta I_C \leq \Delta I_{REF2}$ is satisfied, then the optimal supply voltage of the primary unit is reached. Again, the optimal operating voltage has been determined without any direct feedback from any secondary unit. In one embodiment, the predetermined second threshold value is the same as the first threshold value.

Step 4 is after the optimal supply voltage has been established for the N secondary units. In one example, the voltage stepping is paused (i.e., kept at the same voltage) for a predetermined time ($T_d$).

In step 5, after $T_d$ expires, the supply voltage is continuously stepped down. In one example, the step down size is the same as the step up size. In another embodiment, the step down size is smaller than the step up size. While in yet another embodiment, the step size is reduced every time the direction of the voltage stepping is altered, providing a finer resolution, until a predetermined minimum step size is reached.

After every step down, the current value is recorded in a memory. The difference between a new current value ($I_0$) and the prior current value ($I_1$) is determined. A gradient of the current versus voltage is determined for each voltage step and stored in the memory. This value is compared to a predetermined third threshold value ($\Delta I_{REF3}$). In one embodiment, the predetermined third threshold value is the same as the second threshold value used during the step up. If $\Delta I_C \leq \Delta I_{REF3}$, then the optimal supply voltage of the primary unit has not been reached and the stepping down of the voltage continues. However, the first instance where $\Delta I_C > \Delta I_{REF3}$ is indicative that the optimal point is in the vicinity.

In step 6, the voltage is stepped up again and the cycle continues with step 1.

The foregoing exemplary method continually adjusts the optimum voltage value of the primary unit of a wireless power transfer system without direct feedback from the secondary unit. While a ramp up before a ramp down has been described, the same concepts can be applied using a ramp down and then a ramp up.

Figure 15:
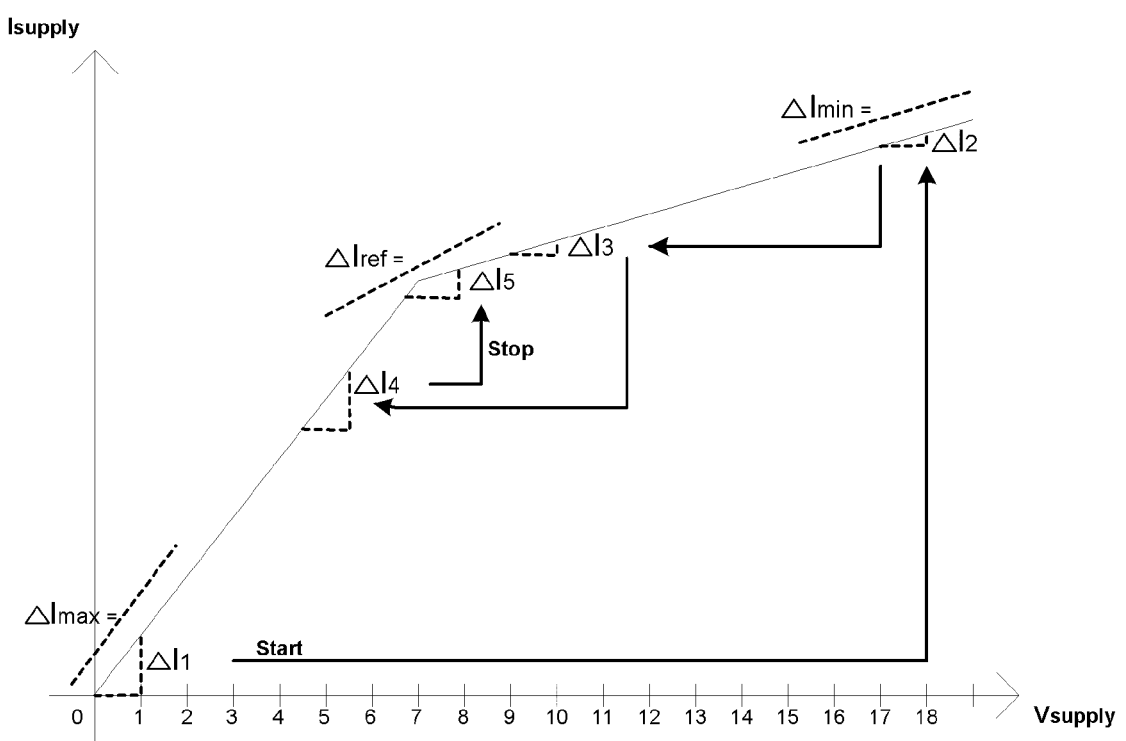
FIG. 15 shows a simplified graph of how the primary unit current (I) varies as the primary unit voltage (V) is increased in an inductive power transfer system with a regulated output secondary unit wherein a binary search is performed for the optimal supply voltage.

FIG. 15 illustrates an example of how the optimal voltage point may be determined using a binary search. It provides a simplified graph of how the current (I) varies at different voltage (V) levels, wherein the current and voltage values are in the primary unit of a wireless power transfer system.

For example, at startup (i.e. step 1), the input voltage is set to the variable $V_{min}$ (i.e., 0V in this example). This voltage is increased by a predetermined voltage step. For example, this voltage step may be 1V. As before, for each input voltage applied, the current consumption is determined and recorded in a memory.

In step 2, the difference between a first current value ($I_1$) and the original current value ($I_0$) is determined. A gradient of the current versus voltage is determined for this voltage step and stored in the memory (i.e., in the $\Delta I_c$ variable).

$$\Delta I_1 = (I_1 - I_0) \quad \text{(Eq. 5)}$$

In step 3, $\Delta I_c$ is compared to a first reference slope (i.e., $\Delta I_{ref}$). If $\Delta I_c$ is less than or equal to the pre-programmed value ($\Delta I_{ref}$), there is no load present. The optimum supply voltage in this situation is $V_{min}$. In this regard, the voltage stepping is paused for a pre-programmed time $T_d$. When $T_d$ expires, the method is reconvened at step 1.

If $\Delta I_c$ is greater than $\Delta I_{ref}$, it indicates that the optimal input voltage has not been reached and the method continues with step 4 below.

In step 4, the supply voltage is changed to $[V_{max}-1]V$. For example, $V_{max}$ represents the maximum supply voltage of the primary unit. In the example of FIG. 15, it is 18V.

The current value ($I_0$) is sampled and stored. Next, the supply voltage is changed to $V_{max}$. The current value at this voltage ($I_1$) is also sampled and stored. The new gradient ($\Delta I_2$ in this example) which is equal to $[I_1-I_0]$ is calculated. This second slope is stored (e.g., in the $\Delta I_c$ variable).

In step 5, the $\Delta I_c$ is compared against the $\Delta I_{ref}$. If $\Delta I_c$ is greater than $\Delta I_{ref}$, the optimum voltage is the maximum supply voltage of the transmitter. The input voltage is set to $V_{max}$ and the $T_d$ counter is started. Once $T_d$ expires, the method is reconvened at step 1.

However, if $\Delta I_c$ is smaller than or equal to $\Delta I_{ref}$, set $\Delta I_{min} = \Delta I_c$, the optimal input voltage has not been reached and the method continues with step 6 below.

In step 6, the supply voltage is changed to the following:

$$V_{supply} = (V_{low} + V_{high})/2 \quad \text{(Eq. 6)}$$

In Eq. 6 above, $V_{low}$ is a variable that is initialized to $V_{min}$ and $V_{high}$ is initialized to $V_{max}$. The current ($I_0$) at $V_{supply}$ is sample and stored. Next, the $V_{supply}$ is increased by a predetermined amount (e.g., 1V) and current ($I_1$) is sampled again.

In step 7, the gradient is calculated at the present voltage (e.g., $\Delta I_3$).

$$\Delta I_3 = (I_1 - I_0) \quad \text{(Eq. 7)}$$

The $\Delta I_c$ variable is updated with new gradient.

In step 8, a determination is made whether $\Delta I_c$ is greater than $\Delta I_{min}$ and less than or equal to $\Delta I_{ref}$. If so, the method continues with step 10 discussed below. Otherwise, the method continues with step 9 below.

In step 9, the calculated $\Delta I_c$ is compared with the $\Delta I_{min}$ and $\Delta I_{ref}$. If the $\Delta I_c$ is greater than $\Delta I_{ref}$, the optimum supply voltage lies between the current $V_{supply}$ and $V_{high}$. Accordingly, the $V_{low}$ is set to the present supply voltage ($V_{supply}$).

However, if $\Delta I_c$ is less than or equal to $\Delta I_{min}$, the optimum supply voltage lies between the current $V_{low}$ and $V_{supply}$. In this regard, the $V_{high}$ is set to the present supply voltage ($V_{supply}$).

Steps 6 to 8 are repeated with the new values for $V_{low}$ and $V_{high}$.

Step 10 represents an exit condition. That is because the optimum supply voltage is reached. The voltage stepping is paused (i.e., held at a constant voltage) for the pre-programmed time ($T_d$). Once the $T_d$ expires, the method continues with step 1, thereby continuously adjusting to the optimal input voltage level.

While the foregoing method was described in terms of a single slope change, those skilled in the art will readily realize that multiple slope changes (i.e., multiple secondary units) are supported as well. For example, the $\Delta I_{ref}$ may be programmed such that its value is between $\Delta I_{min}$ and the second lowest slope in the IV curve.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The invention claimed is:

1. A circuit for wirelessly coupling electrical energy between an electrical energy source and at least one load, comprising:
   a primary unit comprising:
      an input node for receiving an input voltage produced by the energy source;
      a transmitter circuit including a transmitter coil configured to generate an electromagnetic field; and
      a regulator configured to:
         sense a current consumption of the primary unit,
         determine a gradient of the current consumption with respect to different input voltages, and
         determine an optimal input voltage based on the gradient of the current consumption of the primary unit with respect to different input voltages; and
   at least one secondary unit, each secondary unit comprising:
      a receiver circuit including:
         a receiver coil to wirelessly and inductively couple with the electromagnetic field of the primary unit to receive power therefrom;
         a regulator circuit configured to provide a constant power to an output node; and
      a load coupled to the output node.

2. The circuit of claim 1, wherein:
   the transmitter circuit further includes a DC to AC converter; and
   the electrical energy source is DC.

3. The circuit of claim 1, further comprising a DC/DC converter for producing a DC output in response to an input DC voltage and to a feedback signal.

4. The circuit of claim 1, wherein the optimal point for the input voltage is based on an indirect determination of the power requirement of the at least one secondary unit by the primary unit.

5. The circuit of claim 1, wherein the optimal point of the input voltage is based on the gradient of the current consumption with respect to the input voltage, being equal to or below a predetermined threshold.

6. The circuit of claim 2, wherein:
   the primary unit further comprises a DC/DC converter coupled to the input node, operative to produce a DC signal and accept a feedback signal; and
   the regulator comprises:
      a sense resistor coupled to the output of the DC/DC converter;
      a current sensor configured to sense the current through the sense resistor and to produce an output signal proportional to the current through the sense resistor; and
      a digital logic and memory circuit coupled to the output of the current sensor, configured to provide a feedback signal to the DC/DC converter and to store a current value at every voltage step, respectively.

7. The circuit of claim 2, wherein:
   the primary unit further comprises a DC/DC converter coupled to the input node, configured to produce a DC signal and accept a feedback signal; and
   the regulator comprises:
      a sense resistor coupled to the output of the DC/DC converter;
      a transconductance amplifier to sense the current through the sense resistor and to produce an output signal proportional to the current through the sense resistor across an output resistor;
      an A/D converter coupled to the output of the transconductance amplifier, configured to sense a voltage across the output resistor of the transconductance amplifier;
      a digital logic and memory circuit coupled to the output of the A/D converter, wherein the memory is configured to store a current value at every voltage step; and
      a D/A converter coupled to the output of the digital logic and memory circuit, configured to provide a feedback signal to the DC/DC converter.

8. The circuit of claim 1, wherein the at least one secondary unit is configured to obtain power wirelessly from the primary unit through inductive coupling.

9. A method for controlling electrical wireless power transfer in an electrical power transfer system comprising a primary unit configured to generate an electromagnetic field and at least one secondary unit configured to couple with the electromagnetic field and provide a regulated output voltage to its respective load, the method comprising:
   ramping an input voltage in the primary unit in a first direction;
   sensing a current consumption in the primary unit at predetermined input voltage steps;
   storing a current consumption for each input voltage in a memory;

calculating a gradient of the current consumption with respect to input voltage for each voltage step;

recording the gradient of the current consumption for each voltage step in the memory;

comparing the gradient between each voltage step to a predetermined first threshold;

determining an optimal input voltage in the primary unit, wherein an optimal input voltage is at an input voltage where the gradient is equal to or less than the predetermined first threshold.

10. The method of claim 9 further comprising:

setting the input voltage at one voltage step further in the first direction of the determined optimal input voltage; and keeping the input voltage fixed at one voltage step further in the first direction of the determined optimal input voltage for a predetermined delay period.

11. The method of claim 10 wherein the predetermined delay period is based on at least one of (i) how fast the load of the at least one secondary unit changes and (ii) a minimum speed at which the primary unit can react to the change in its supply voltage.

12. The method of claim 9 wherein, after the predetermined delay period expires, the method further comprising:

ramping the input voltage in the primary unit in a second direction, wherein the second direction is opposite to the first direction;

sensing the current consumption in the primary unit at predetermined input voltage steps;

storing a current consumption for each input voltage in a memory;

calculating a gradient of the current consumption with respect to input voltage for each voltage step;

recording the gradient of the current consumption for each voltage step in the memory;

comparing the gradient between each voltage step to a predetermined second threshold value; and if the gradient at a voltage step is greater than the predetermined second threshold value, then returning to the step of ramping the input voltage in the primary unit in the first direction.

13. The method of claim 12 wherein the predetermined second threshold value is the same as the predetermined first threshold value.

14. The method of claim 9 wherein ramping the input voltage in the first direction comprises increasing the input voltage at predetermined voltage steps and at predetermined time intervals.

15. The method of claim 14 wherein:

the voltage steps are uniform; and the time intervals of each sample are uniform.

16. The method of claim 9 wherein a gradient in the first direction that is greater than a predetermined first threshold value but less than gradient in the previous voltage step, indicates that at least one secondary unit achieved regulation of its respective load.

17. The method of claim 12 wherein a gradient in the second direction that is greater than a predetermined first threshold value, indicates that at least one secondary unit lost regulation of its respective load.

18. The method of claim 9 wherein the first predetermined threshold is set to be larger than the inherent random offsets, repetitive dynamic variations and systematic inaccuracies in the primary unit and the at least one secondary unit.

19. The method of claim 9 wherein:

there are a plurality of secondary units; and the optimal input voltage in the primary unit is at a last change in gradient.

20. The method of claim 12, wherein each voltage step in a first direction is larger than each voltage step in a second direction.

21. The method of claim 12, wherein a voltage step size is reduced every time the direction of the ramp changes, until a predetermined minimum voltage step size is reached.

22. A method for controlling electrical wireless power transfer in an electrical power transfer system comprising a primary unit configured to generate an electromagnetic field and at least one secondary unit configured to couple with the electromagnetic field and provide a regulated output voltage to its respective load, the method comprising:

varying an input current of the primary unit as a function of input voltage;

incrementally measuring a current gradient of the primary unit as a function of input voltage;

comparing the current gradient to a predetermined threshold; and determining an optimal input voltage in the primary unit, wherein an optimal input voltage is at an input voltage where the current gradient is equal to or less than the predetermined first threshold.

23. A method for controlling electrical wireless power transfer in an electrical power transfer system comprising a primary unit configured to generate an electromagnetic field and at least one secondary unit configured to couple with the electromagnetic field and provide a regulated output voltage to its respective load, the method comprising:

in step 1:

setting an input voltage in the primary unit to a predetermined $V_{min}$ value;

increasing the input voltage by a predetermined voltage step;

sensing a current consumption in the primary unit at each input voltage value; and storing the current consumption at each input voltage value in a memory;

in step 2:

calculating a gradient of the current consumption with respect to input voltage for the voltage step; and storing the gradient as a present-gradient in a memory;

in step 3:

comparing the present-gradient to a first reference gradient;

if the present-gradient is less than or equal to the first reference gradient, then keeping the input voltage fixed for a predetermined delay period; and going back to step 1 after an expiration of the predetermined delay period;

if the present-gradient is greater than the first reference gradient, then going to step 4;

in step 4:

changing the input voltage in the primary unit to a predetermined $V_{max}$ value minus the predetermined voltage step, wherein the predetermined $V_{max}$ value is higher than the predetermined $V_{min}$ value;

increasing the input voltage by the predetermined voltage step;

sensing a current consumption in the primary unit at each input voltage value;

storing the current consumption for each input voltage value in a memory;

calculating a gradient of the current consumption with respect to input voltage for the voltage step; and storing the gradient of the current consumption as the present-gradient in a memory;

in step 5:
comparing the present-gradient to the first reference gradient;
if the present-gradient is greater than the first reference gradient, then:
setting the input voltage to $V_{max}$;
keeping the input voltage fixed at $V_{max}$ for the predetermined delay period; and
upon expiration of the delay period, going back to step 1;
if the present-gradient is less than or equal to the first reference gradient, then:
storing the present gradient as the minimum reference gradient
setting a $V_{low}$ to $V_{min}$ and $V_{high}$ to $V_{max}$; and
continuing with step 6;

in step 6:
changing the input voltage in the primary unit to $(V_{low}+V_{high})/2$;
increasing the input voltage by the predetermined voltage step;
sensing a current consumption in the primary unit at each input voltage value;
storing the current consumption at each input voltage value in a memory;
calculating a gradient of the current consumption with respect to input voltage for the voltage step; and
storing the gradient as a present-gradient in a memory;

in step 7:
calculating a gradient of the current consumption with respect to input voltage for the voltage step; and
storing the gradient as a present-gradient in a memory;

in step 8:
comparing the present-gradient to the first reference gradient and a minimum reference gradient;
if the present-gradient is greater than the minimum reference gradient, and less than or equal to the first reference gradient, then going to step 10;
otherwise, going to step 9;

in step 9:
if the present-gradient is greater than the first reference gradient, then setting the $V_{low}$ to the present input voltage of the primary unit;
if the present-gradient is less than or equal to the minimum reference gradient, then setting $V_{high}$ to the present input voltage of the primary unit; and
repeating steps 6 to 8;

in step 10:
keeping the input voltage fixed for the predetermined delay period; and
after an expiration of the predetermined delay period, repeating the method by going back to step 1.

* * * * *